United States Patent [19]
Durand et al.

[11] 4,400,058
[45] Aug. 23, 1983

[54] TUNABLE FABRY-PEROT FILTER

[75] Inventors: William W. Durand, Edina; Ronald E. Peterson, Shoreview, both of Minn.

[73] Assignee: Honeywell Inc., Minneapolis, Minn.

[21] Appl. No.: 384,842

[22] Filed: Jun. 4, 1982

Related U.S. Application Data

[63] Continuation-in-part of Ser. No. 159,984, Jun. 16, 1980, abandoned.

[51] Int. Cl.$^3$ ............................................. G02B 5/28
[52] U.S. Cl. .................................... 350/166; 356/352
[58] Field of Search ............... 350/164, 163, 166, 1.6, 350/1.7; 356/352

[56] References Cited

U.S. PATENT DOCUMENTS

| | | |
|---|---|---|
| 3,449,692 | 6/1969 | Haake . |
| 3,454,325 | 7/1969 | Ohm . |
| 3,466,565 | 9/1969 | Rigrod . |
| 3,546,620 | 12/1970 | Erickson et al. . |
| 3,612,655 | 10/1971 | Buchan et al. . |
| 3,699,347 | 10/1972 | Buchan et al. . |
| 3,758,194 | 9/1973 | Daval et al. . |
| 3,775,699 | 11/1975 | Cassels . |
| 3,959,548 | 5/1976 | Bernal . |
| 4,081,760 | 3/1978 | Berg . |

OTHER PUBLICATIONS

A. K. Jain, W. W. Durand, G. R. Knowles, J. G. Droessler, A Reprint From the Proceedings of SPIE-The International Society for Optical Engineering, Imaging Spectroscopy, Feb. 10-11, 1981, vol. 268.
Jenkins et al., "Fundamentals of Optics", McGraw-Hill, New York, 3rd Edition, 1957, p. 398.
Stone, J. M., "Radiation and Optics", McGraw-Hill, N.Y., 1963.
Smith, S. D., "A Tunable Infra-Red Interference Filter", Journal of Scientific Instruments, vol. 34, No. 12, Dec., 1957, pp. 492-497.
"Lead Sulphide, Lead Selenide and Lead Telluride", Journal of Scientific Instruments, vol. 32, Jan. 1955, pp. 10-11.

*Primary Examiner*—Bruce Y. Arnold
*Attorney, Agent, or Firm*—Charles J. Ungemach

[57] ABSTRACT

A tunable Fabry-Perot filter for transmitting light in the wavelength range from 3-40 microns is disclosed wherein a pair of low index substrates of refractive index less than 2.4 and positioned between an adjustable spacer means have, on their facing sides, a non-metallic coating of refractive index of at least 4.0 and of optical thickness less than one-half the minimum wavelength to be transmitted. Preferred substrates are potassium halides, cesium halides, and zinc selenide, and preferred high index coatings are from the group of lead telluride, bismuth telluride, germanium telluride and germanium.

6 Claims, 2 Drawing Figures

TUNABLE FABRY-PEROT FILTER

BACKGROUND OF THE INVENTION

This application is a continuation-in-part of our prior application Ser. No. 159,984 (now abandoned) filed June 16, 1980, entitled "Tunable Fabry-Perot Filter."

Fabry-Perot filters are designed to pass narrow spectral ranges of light at a high efficiency with essentially no transmission of light of different wavelengths. U.S. Pat. No. 3,758,194, for example, discloses an inferometer such as a Fabry-Perot modulator for use wherein the transparency may be infra-red or visible. U.S. Pat. No. 4,081,760 discloses a Fabry-Perot filter with a reflective coating and a piezoelectric crystal so that the wavelength of the transmitted radiation may be controlled over a preselected spectral range by changing the spacer thickness. Fabry-Perot inferometers with a peizoelectric crystal and a modulation condensor have also been used in laser modulation systems such as shown in U.S. Pat. No. 3,449,692.

U.S. Pat. No. 3,775,699 discloses a laser having a gas-filled Fabry-Perot mode selector where the spacing of the surfaces may be varied for tuning purposes. The device shown employs a piezoelectric crystal as does U.S. Pat. No. 3,466,565 which shows a laser mode selection device.

BRIEF DESCRIPTION OF THE INVENTION

It has now been discovered that a fully tunable Fabry-Perot filter device may be built in the following manner. Specifically, it has been discovered that a Fabry-Perot filter can be built which gives high selectivity of wavelength transmitted and also allows an extremely wide range of wavelengths to be selected for transmission. The specific device includes a pair of low index substrates having a refractive index less than 2.4 and mounted in parallel relationships so as to present facing sides to each other in an optical path. A high index, non-metallic or non-absorbing coating having a refractive index of at least 4.0 is placed on the facing sides of each of said low index substrates. As used herein, "non-metallic" includes certain dielectric or semi-conductor materials such as germanium, germanium telluride, bismuth telluride and lead telluride which are non-absorbing at wavelengths of 3 to 40 microns and have high indexes of refraction. Spacer means for mounting the low index substrates and adjusting the distance between the facing sides is provided. Such a construction results in a Fabry-Perot filter which, by varying the distance between the facing sides, transmits relatively narrow wavelength bands of light, but can be adjusted over an extremely wide range of possible wavelengths to be selected.

This invention utilizing conventional materials, obtains the extremely large spectral range through certain unique interference effects which occur between high index coatings and the low index of refraction of the space, e.g., air with a refractive index of 1 or other low index materials such as nitrogen. Low index substances enhance this effect.

It is preferred that the low index substrate have a refractive index less than 2.4 and preferably below 1.8. The various potassium halides such as potassium iodide and potassium chloride have an index of refraction in the order of about 1.6 to about 1.8. The various cesium halides and zinc selenide are other examples of low index substrates having indexes of refraction below 2.4. Particularly preferred in potassium chloride because it has an index of refraction of approximately 1.4. These halides are also known to have low absorption characteristics in the 3 to 40 micron wavelength range which is desirably needed.

The high index non-metallic coating, which may be a single layer, is placed on the facing sides of the two low index substrates and should have an index of refraction of at least 4.0. Preferably, the index of refraction of the coating must be at least twice as high as the index of the substrate and preferably from 3 to 4 times as high. Germanium, and the various tellurides, such as lead telluride, bismuth telluride and germanium telluride are examples of high index materials which may be used as coatings. The thickness of the coating will vary depending upon the substrate and the material, but should have an optical thickness less than ½ of the wavelength which is the smallest wavelength to be transmitted through the device in order to obtain maximum constructive interference and reflectance. Transmission of light will occur where the high refractive index coating has an optical thickness of ¼ wavelength. For that reason, the high refractive index coating should have an optical thickness less than one-half of the shortest wavelength being transmitted to prevent transmission of an undesired band of light. Such construction will pass the primary wavelength as well as some harmonics at the ½ wavelength, ⅓ wavelength, and the like.

The distance between the two faces coated with the high index coating can be varied through the use of piezoelectric ceramic to adjust the device to pass different wavelengths. The piezoelectric device may be as simple as a piezoelectric cylinder connected to an appropriate variable voltage source.

DESCRIPTION OF THE PREFERRED EMBODIMENT

Figure 1:
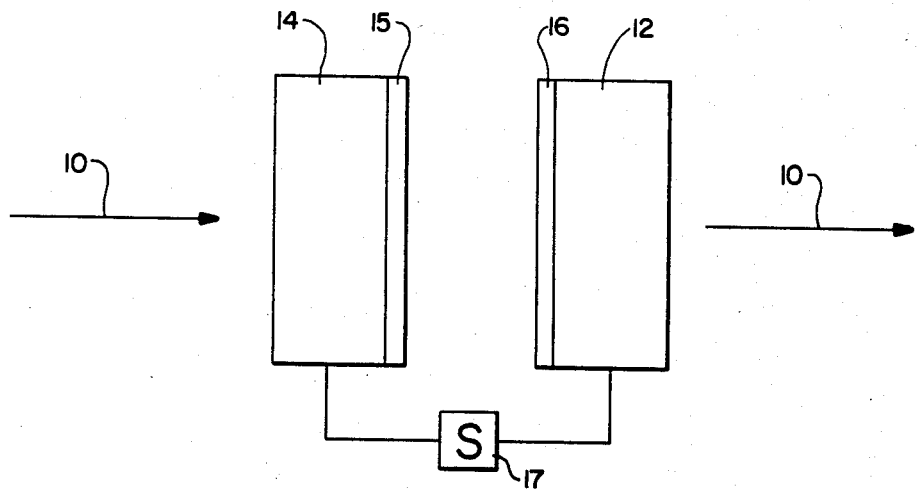
Figure 2:
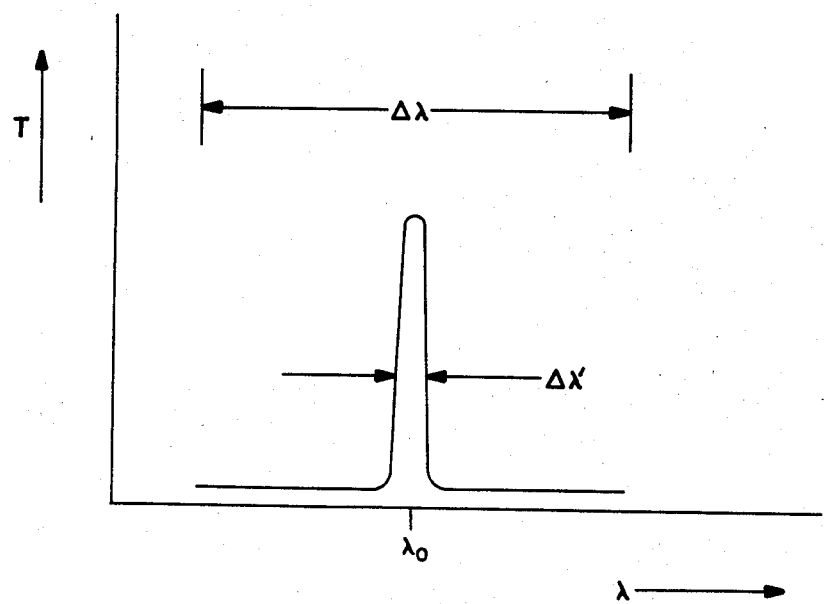

For a more complete understanding of the invention, reference is hereby made to the drawings, in which:

FIG. 1 represents a schematic view of the preferred embodiment of this invention; and FIG. 2 represents graphically the typical output of the preferred embodiment of this invention.

As shown in FIG. 1, a source of light 10 passes through the device in the directions shown by the arrows 10. A pair of low index substrates 12 and 14 having a refractive index less than 2.4 are mounted in parallel relationship so as to present facing sides to each other in the optical path shown by arrow 10. A high index non-metallic or non-absorbing coating 15 and 16 having a refractive index of at least 4.0 is placed on the facing sides of the low index substrates 12 and 14. A non-absorbing coating has only a real refractive index value, unlike metals which may have large imaginary refractive index components. Metallic coatings have a high degree of absorption and have not been found satisfactory for obtaining the wide range effects of the present invention. For example, metallic coatings generally absorb 60% or more of the radiation while dielectric coatings of the present invention have been found to absorb considerably less than 10% of the radiation. Spacer means 17 is provided for mounting the low index substrates 12 and 13 and adjusting the distance between the facing sides having the coatings 15 and 16.

As has been discussed here and above, it is preferred that the low index substrate have a refractive index less than 2.4, which includes the alkali halides and zinc selenides. Those particularly preferred because of their refractive index, are potassium chloride and potassium bromide.

It is also preferred that the high index non-metallic or non-absorbing coating be one having an index of refraction of at least 4.0. Examples of suitable materials for this coating consist of members of the group of germanium lead telluride, bismuth telluride and germanium telluride.

Light passing along optical path 10 is normally comprised of a wide variety of wavelengths, only one band of which is of particular interest for a given application. For example, infra-red radiation may be passing along the path 10 and it may be desirable to known that the amount, if any, of infra-red at a certain wavelength, such as 17 microns. By suitable adjustment of the spacer means 17, only radiation having a wavelength of approximately 17 microns will pass through the device.

In FIG. 2, the amount of transmission is shown along the vertical axis while the wavelength of the light is shown along the horizontal axis.

$\lambda_0$ is the desired wavelength of light to be transmitted. By proper tuning of the substrates 12 and 14 through the spacer means 17, substantially all of the light at wavelength $\lambda_0$ passes through the device showing a high degree of transmission through a narrow range of $\Delta\lambda^1$. By suitable adjustment of the spacer means 17, however, $\lambda_0$ can be varied over the entire wavelength band $\Delta\lambda$ with essentially the same narrow $\Delta\lambda^1$ transmission. This is particularly useful in the infra-red range of from about 3 microns to about 40 microns and is not possible using conventional interferometers. Particularly preferred as an embodiment of the present invention is a device in which the low index substrate comprises potassium chloride, the high index coating is lead telluride and the spacer means is adapted to pass infrared light having a wavelength ranging from 3 microns to 40 microns.

Having thus described the invention, what is claimed is:

1. A tunable Fabry-Perot filter device, comprising:
   a pair of low index substrates having a refractive index of less than 2.4 and mounted in parallel relationship so as to present facing sides to each other in an optical path;
   a high index, non-metallic coating having a refractive index of at least 4.0 and an optical thickness less than one half of the minimum wavelength to be transmitted, said high index coating being on said facing sides of each said low index substrates; and
   spacer means for mounting said low index substrates and for adjusting the distance between said facing sides.

2. The device of claim 1, wherein said low index substrate is selected from the group of low index materials consisting of potassium halide, cesium halide and zinc selenide.

3. The device of claim 2, wherein said potassium halide is potassium chloride.

4. The device of claim 1, wherein said high index non-metallic coating is selected from the group consisting of lead telluride, bismuth telluride, germanium telluride and germanium.

5. The device of claim 1 wherein said spacer means is adapted to vary the distance between said facing sides to pass light of a wavelength ranging from 3 microns to 40 microns.

6. A pair of low index substrates having a refractive index of less than 2.4 and mounted in parallel relationship so as to present facing sides to each other in an optical path;
   a high index non-metallic coating which is less than ten percent absorbing in the 3 to 40 micron wavelength range and has a refractive index of at least 4.0 and an optical thickness less than one half of the minimum wavelength to be transmitted; said high index coating being on said facing sides of each said low index substrates; and
   spacer means for mounting said low index substrates and for adjusting the distance between said facing sides.

* * * * *